United States Patent [19]

Kenny et al.

[11] 4,425,931

[45] Jan. 17, 1984

[54] SPEED BIAS FLUID PRESSURE REGULATOR AND SYSTEMS UTILIZING SAME

[75] Inventors: Andrew A. Kenny, Roselle; Ronald J. Wojtecki, Naperville, both of Ill.

[73] Assignee: Eaton Corporation, Cleveland, Ohio

[21] Appl. No.: 344,898

[22] Filed: Feb. 1, 1982

[51] Int. Cl.³ .......................................... G05D 16/06
[52] U.S. Cl. .................................. 137/53; 137/116.5; 137/DIG. 8
[58] Field of Search ................. 137/53, 116.5, DIG. 8

[56] References Cited

U.S. PATENT DOCUMENTS

| | | | |
|---|---|---|---|
| 3,077,921 | 2/1963 | Zubaty | 137/53 X |
| 3,298,482 | 1/1967 | Mueller | 123/351 X |
| 3,545,472 | 12/1970 | Franz | 137/116.5 |
| 3,770,195 | 11/1973 | Franz | 236/13 |

*Primary Examiner*—Robert G. Nilson

*Attorney, Agent, or Firm*—C. H. Grace; A. E. Chrow; R. A. Johnston

[57] ABSTRACT

Disclosed is a speed controlled fluid pressure regulator that is adapted to provide a fluid pressure control signal for use in a variety of control functions in response to changes in rotational speed of an object such as a rotating component of an internal combustion engine. The regulator is controlled by a speed biasing mechanism that utilizes a counterbalancing arrangement between a biasing means and a component that is moved by a centrifugal weight assembly in response to changes in the rotational speed of the object being monitored to position a valve of the regulator with a high degree of sensitivity which in turn enables the regulator to provide the output fluid pressure control signal from a fluid pressure source in a highly effective manner. Also disclosed is the use of the regulator in conjunction with fluid pressure signals derived from other sources such as from changes in pressure or the position of an internal combustion engine throttle which can be used to advantage in controlling the supercharger of the engine.

16 Claims, 8 Drawing Figures

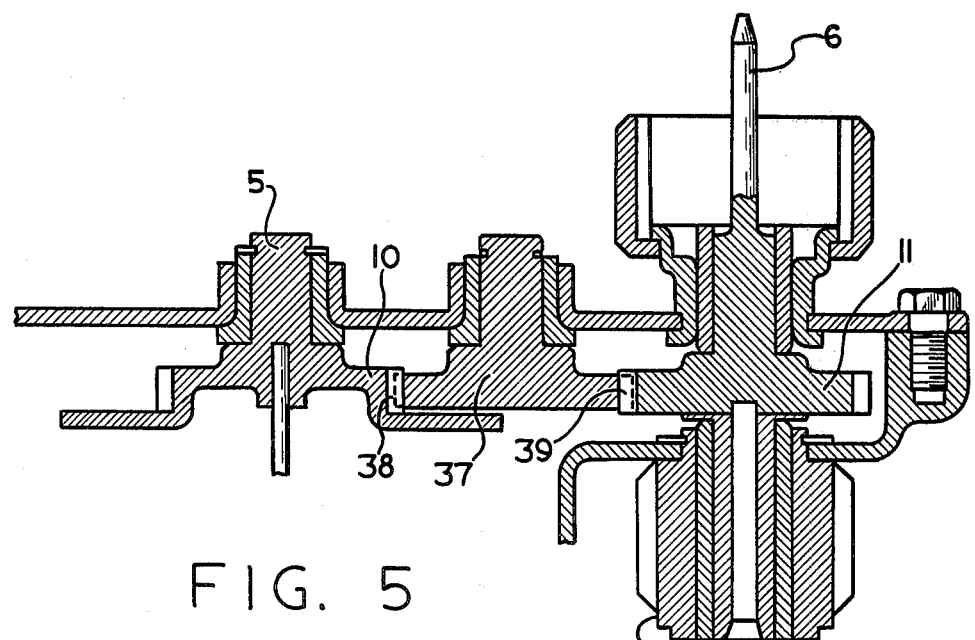
FIG. 5
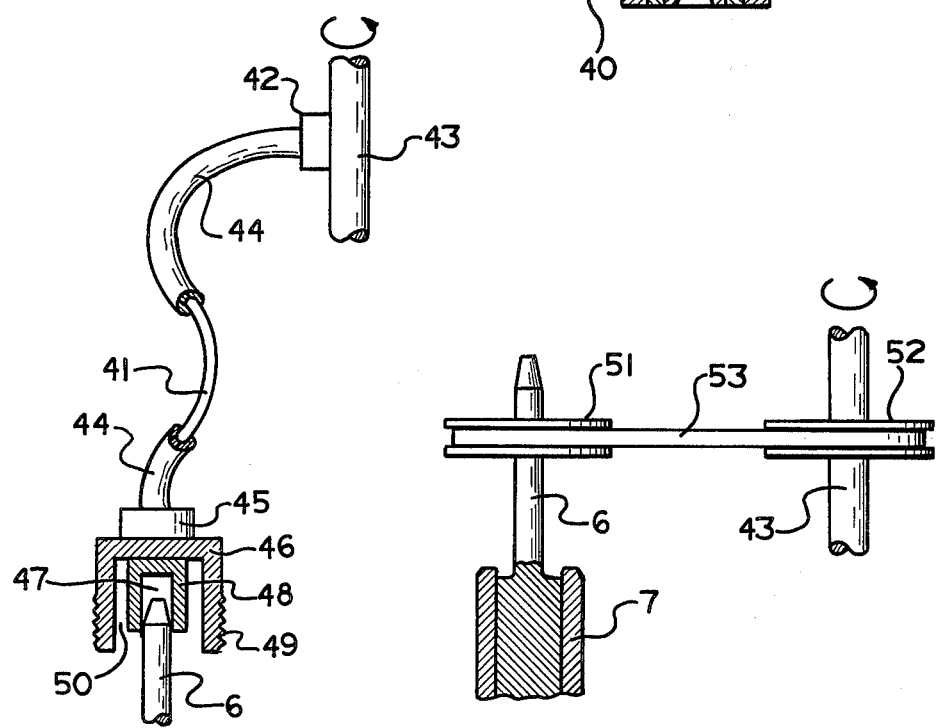
FIG. 6A
FIG. 6B

SPEED BIAS FLUID PRESSURE REGULATOR AND SYSTEMS UTILIZING SAME

INTRODUCTION

This invention relates generally to a means for deriving a fluid pressure signal that is proportional to the rotational speed of an object and more particularly to a mechanism having a rotatable member that is able to regulate a fluid pressure regulator to provide a fluid pressure signal therefrom that is highly sensitive to changes in the rotational speed of an object which is being monitored by the mechanism and the use of such signal especially in the control of the operating conditions of an engine and/or accessories associated therewith that are responsive to control by the fluid pressure signal.

CROSS REFERENCE

The subject matter of this application is related, in certain aspects, to that of U.S. Pat. No. 3,298,482; U.S. Pat. No. 3,770,195; U.S. patent application Ser. No. 289,545 filed Aug. 3, 1981; U.S. patent application Ser. No. 309,286, filed Oct. 7, 1981; and to U.S. patent application Ser. No. 322,806 filed Nov. 18, 1981 owned by the assignee of the present invention.

BACKGROUND OF THE INVENTION

The use of fluid pressure, whether in the form of a vacuum below atmospheric pressure or in the form of a positive pressure above atmospheric pressure has long been known in the prior art for controlling various devices. Many devices for regulating fluids at vacuum or at positive pressures is likewise known to the art. Generally such fluid pressure regulators have been controlled in the past either manually or in response to some type of electrical, mechanical or fluid signal that conveys some type of a command to the regulator. Additionally, changes in parameters such as temperature, pressure and fluid flow have been commonly used in the past as a means of causing a change in the regulation of fluid pressure so as to commence some corrective function to dampen or eliminate the change.

The concept of using changes in rotational speed is particularly useful for controlling various accessories associated with motor vehicle engines since in many instances a rotating component of the engine can be readily monitored for changes and the engine itself can be used to drive an air compressor or vacuum pump to provide the fluid pressure supply for use by a fluid pressure regulator to provide the fluid pressure control signal to control the particular accessory. Motor vehicle accessories that can be adapted to be controlled by fluid pressure signals include, pollution control devices, vacuum tachometers, cruise control, transmission shifting mechanisms and for clutching and de-clutching accessories such as compressors, alternators and the like as well as controlling or otherwise monitoring such operating conditions as, for example, the engine idling speed or coolant fluid temperature.

Of particular interest is the use of a change in the rotational speed of an engine as a means of controlling a supercharger for boosting air intake into the engine at a predetermined engine speed so as not to burden the engine with the load of the supercharger when the engine is idling. Also of interest in controlling the supercharger of an engine is the use of changes in at least one additional engine operating condition such as the throttle position, altitude, coolant temperature and the like in combination with a change in the engine rotational speed in such a manner that the combination is able to regulate a fluid pressure regulator to provide a fluid pressure control signal that is able to effectively control the supercharger.

An example of one type of mechanism that utilizes a governor to provide a cruise control for controlling the speed of a motor vehicle is disclosed in U.S. Pat. No. 3,298,482. The mechanism however incorporates a complex combination of mechanical and electromechanical components and is not able to utilize the governor in a simple manner to provide a fluid pressure control signal that is highly sensitive to changes in the rotational speed of the object being monitored by the mechanism and is susceptible to high maintenance expenses.

In view then of the many applications for which changes in rotational speed of an object may be effectively used singularly or in combination with one or more other fluid pressure signals for use in control functions, a need exists to provide a mechanism that is simple in construction and is easily maintained at minimal expense while being able to provide a fluid pressure signal that is highly sensitive to changes in the rotational speed of an object being monitored by the mechanism.

SUMMARY OF THE INVENTION

Accordingly, it is an object of this invention to provide a mechanism which is able to simply and effectively convert changes in the rotational speed of an object such as an engine into a fluid pressure control signal that can be utilized to control the engine operating conditions and/or accessories associated therewith that are responsive to such control.

It is another object of this invention to provide a mechanism that is easily maintained and is able to simply and effectively convert changes in the rotational speed of an object such as an engine into a regulated fluid pessure signal that either singularly or in combination with at least one additional fluid signal arising from a change in an engine operating condition other than a change in the rotational speed is able to control an engine operating condition and/or one or more accessories associated therewith that are responsive to such fluid pressure control with a high degree of sensitivity.

It is still a further object of this invention to provide a system that is able to effectively control the operation of a supercharger of an internal combustion engine at a predetermined rotational speed thereof by the use of a fluid pressure control signal that arises from a combination of a fluid pressure signal derived from a change in the rotational speed of the engine in combination with at least one additional fluid pressure signal derived from a change in an operating condition of the engine other than the change in the rotational speed thereof.

BRIEF DESCRIPTION OF THE DRAWINGS

FIG. 5 shows a partial cross-section of a preferred method of rotating a rotatable member of the embodiment of the mechanism of the invention shown in FIGS. 1, 2 and 3;

FIG. 6A shows a partial perspective view of a cable that may be used in conjunction with embodiment of the mechanism of the invention shown in FIGS. 1, 2 and 3;

FIG. 6B shows a partial side elevation view of an embodiment of the mechanism of the invention that is driven by a sheave.

DESCRIPTION OF PREFERRED EMBODIMENTS

Figure 1:
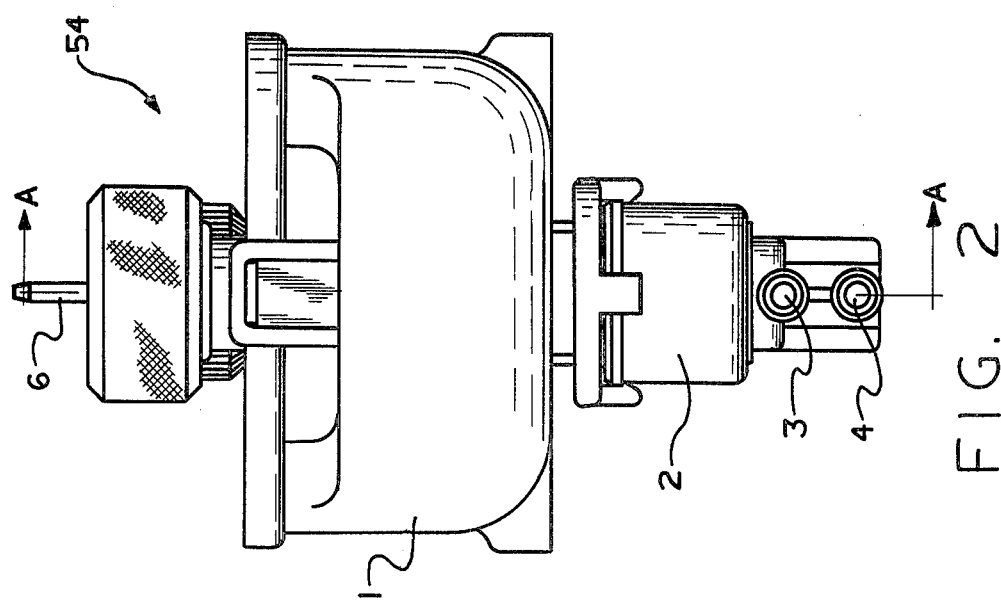
FIG. 1 shows a front side elevation view of an embodiment of the speed bias fluid pressure mechanism of the invention.
Figure 2:
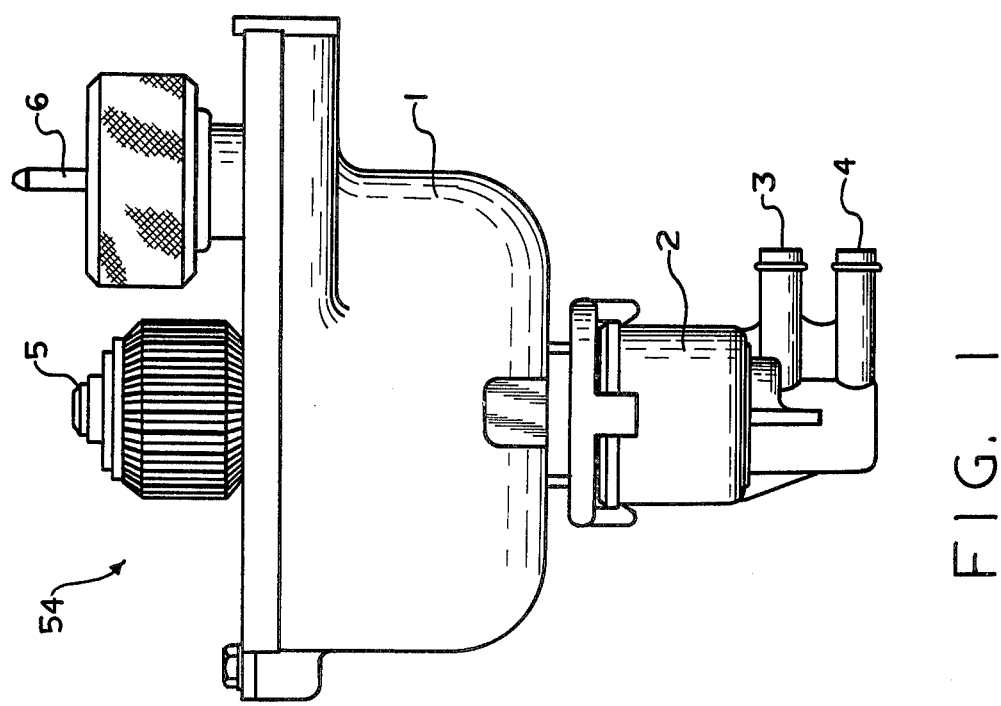
FIG. 2 shows a right side elevation view of the embodiment of the mechanism of FIG. 1.

FIGS. 1 and 2 respectively shows a front side elevation and a right side view of an embodiment 54 of mechanism of the invention hereinafter more fully described with respect to FIG. 3 having a rotatable member 5 contained within a housing 1 that is connected to and positionable with respect to fluid pressure regulator 2. Regulator 2 has a vacuum chamber 36 therewithin having a fluid pressure (vacuum) supply input port 3 and a regulated fluid pressure (vacuum) output signal port 4 in fluid communication therewith. Member 5 is caused to rotate by the rotation of shaft 6 by some means responsive to the rotational speed of the object being measured.

Figure 3:
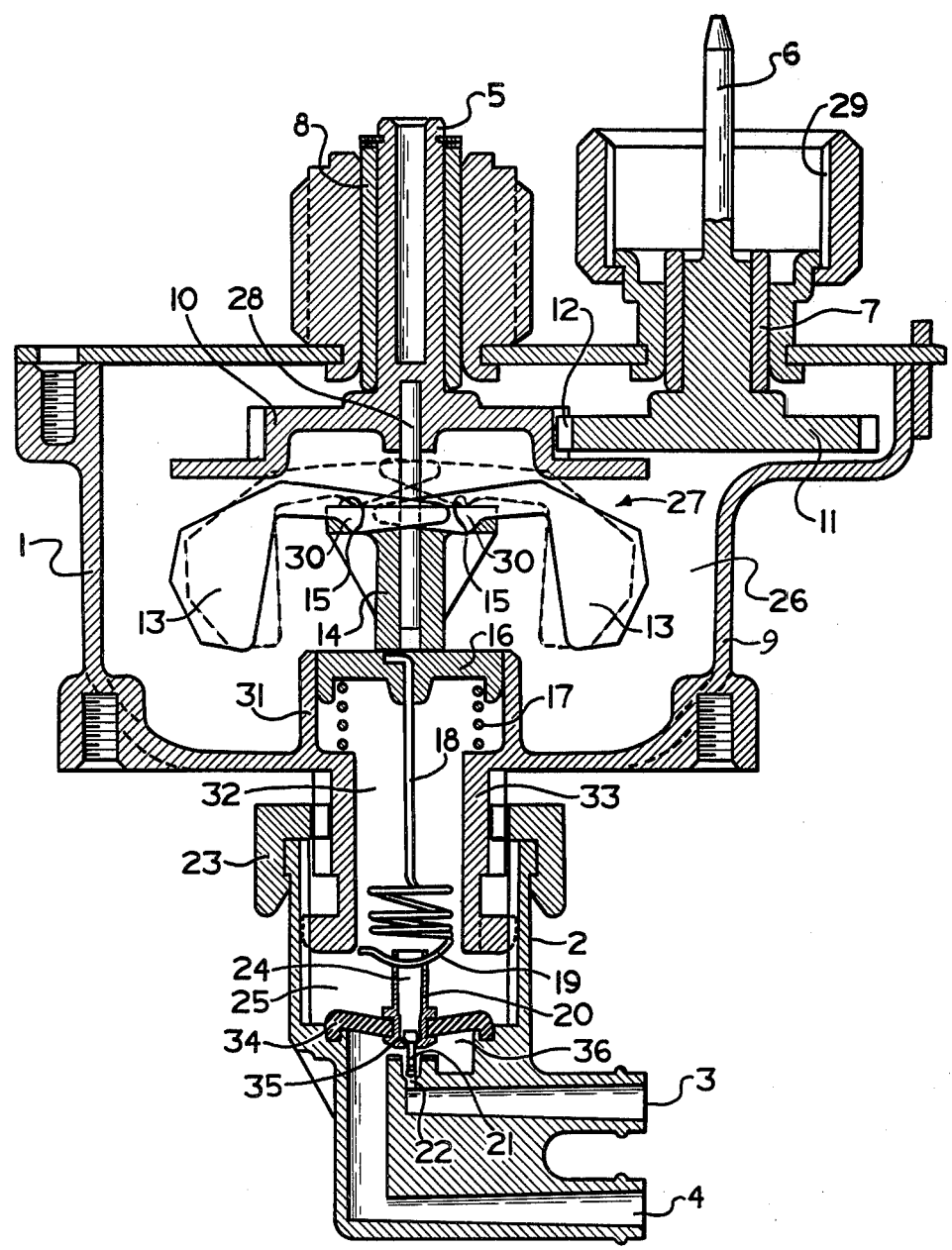
FIG. 3 shows a longitudinal cross-section A—A of the embodiment of the mechanism shown in FIGS. 1 and 2 when viewed from the position shown in FIG. 1.

As shown in FIG. 3, shaft 6 is rotatably supported vertically in housing 1 by means of bearings 7. Although housing 1 is shown in FIGS. 1, 2 and 3 as having a particular design, it is to be understood that any means that is able to rotatably support member 5 and cause the mechanism of the present invention to perform in the manner described herein is considered within the scope of the invention including those embodiments in which member 5 is not supported vertically. The end of shaft 6 within housing 1 is shaped in the form of gear 11. Gear 11 engages with gear 10 of rotatable member 5 at point 12 to cause the rotation thereof in response to the rotation of shaft 6 as previously described. Body member 5 is rotatably supported vertically on housing 1 by means of bearing 8. Although it is preferred to use gears 10 and 11 and shaft 6 or the idler gearing arrangement hereinafter described with respect to FIG. 5 as a means of rotating member 5 at a speed proportional to the rotational speed of the object being monitored, it is to be understood that mechanism of the invention includes any means that is able to monitor the rotational speed of the object and cause member 5 to rotate at a speed proportional to the rotational speed of the object being monitored. One example of the use of a rotating cable to cause members 6 and 5 to rotate is hereinafter described with respect to FIG. 6.

Centrifugal weight assembly 27 is secured to body member 5 within cavity 26 enclosed by wall 9 of housing 1. Assembly 27 is adapted to rotate along with member 5 in response to the rotation of shaft 6. Shaft 28 extends from gear 10 of member 5 into cavity 26. Shaft 28 provides a guide upon which coupling member 14 is moveably mounted. Assembly 27 has a pair of diametrically opposed components 13 that are pivotally secured to member 5 such that they are caused to move radially outwardly away from member 5 when the rotational speed of assembly 27 is increased. An increase in the rotational speed of assembly 27 causes extensions 30 of components 13 to press against coupling member 14 at point 15 and bias member 14 in a direction away from gear 10 along shaft 28. Assembly 27 is shown in both solid line and dashed line form in FIG. 3 to illustrate typical movement of the assembly with respect to shaft 28. Although coupling member 14 is preferably moveably mounted on shaft 28 as shown in FIG. 3, it is to be understood that any means of moveably mounting member 14 so that it does not interfere with the rotation of member 5 and is able to be moved in one direction as a result of the effect of a change in the centrifugal force upon assembly 27 is considered within the scope of the invention. Likewise, it is also to be understood that although it is preferable that extensions 30 of components 13 be biased against member 14 to move it away from gear 10, embodiments in which only one extension 30 of one component 13 is used to bias member 14 away from gear 10 or embodiments in which extension 30 of component 13 is shaped such that either one or both are able to bias member 14 towards gear 10 in response to an increase in the rotational speed of assembly 27 or embodiments in which an additional component or components of assembly 27 are employed to bias member 14 in one direction in response to a change in the rotational speed of assembly 27 is considered within the scope of the invention.

Resilient means, preferably in the form of at least one coiled spring 17, is supported within cavity 32 of open-ended hub 31 which extends from wall 9 of housing 1 into cavity 26 and is aligned with and connects with cavity 26 and with cavity 32 of an extension 33 of wall 9 that extends away from cavity 26. Coil 17 is supported within hub 31 in such a manner as to be compressed by member 14 when member 14 is caused to move away from gear 10 in response to an increase in the rotational speed of assembly 27 as previously described. Component 16 is disposed in moveably abutting engagement with coil 17 within hub 31 between coil 17 and coupling member 14 to provide a surface for pressing coil 17 within hub 31 by means 14 as previously described. As is readily evident from FIG. 3, member 14 is able to increasingly compress resilient means 17 as long as the rotational speed of assembly 27 is continuing to increase. Conversely, when the rotational speed of assembly 27 decreases as a result in a decrease to the rotational speed of shaft 6 in response to decrease in the rotational speed of the object being monitored, components 13 are caused to move radially inwardly towards shaft 28 of member 5 which in turn stops extensions 30 of components 13 from pressing against member 14 and permits compressed resilient means 17 to bias member 14 in an opposite direction along shaft 28 towards gear 10.

Thus the mechanism of the invention contemplates in the broad sense any embodiment by which a coupling member such as member 14 is moveably mounted with respect to a support that rotatably supports member 5 for which at least one component of a centrifugal weight assembly is able to move the coupling member in one direction as a result of a change in centrifugal force upon the assembly and which utilizes a resilient means to move the coupling member in an opposite direction as a result of a change in centrifugal force upon the assembly which is opposite to the change that caused the coupling member to move in the one direction. It is to be noted that the use of a resilient means to move coupling member 14 in a direction opposite to the direction that coupling member 14 is biased by assembly 27 is one of the factors that distinguishes the mechanism of the present invention from the speed biasing mechanism disclosed in U.S. patent application Ser. No. 3,298,482 discloses the use of a leaf spring for such biasing purpose, the mechanism utilizes a complex stator-electrical coil arrangement in combination with a vacuum chamber and not the regulator portion of the mechanism of the invention as hereinafter described.

Fluid pressure (vacuum) regulator 12 is positionally connected to hub 33 of housing 1 by means of threaded nut 23. Regulator 2 is similar in some aspects to the fluid pressure control regulator used in conjunction with the temperature control system disclosed in U.S. Pat. No. 3,770,195. Movement of nut 23 is able to move regulator 2 towards and away from coupling member 14. Regulator 2 has a cavity 25 therewithin that communicates with cavity 32 of hub 31 and with outlet port 4. Linking member 18 is connected to component 16 at one end thereof and at location 19 at the opposite end thereof to a moveable member in the form of vent member 20 in chamber 25 of regulator 2. Member 20 has an open ended channel 24 therewithin that communicates with chamber 25 at the end thereof closest to linking member 18 and with vacuum chamber 36 at the opposite end thereof. Member 20 has an annular groove, not referenced, into which resilient diaphragm 34 is secured. Diaphragm 34 is also secured about its periphery into an annular groove, not referenced, in the walls of regulator 2 that encloses chamber 36 such that diaphragm 34 provides regulator 2 with a cavity 25 on one side thereof and with a fluid pressure (vaccum) chamber 36 on the opposite side thereof with channel 24 of member 20 providing a vent opening therebetween. Chamber 36 communicates with inlet port 3 for receiving a supply of fluid pressure therein and with outlet port 4 for conveying the regulated fluid pressure control signal therefrom. An orifice 22 is disposed between inlet port 3 and outlet port 4. Member 20 has a valve seat 35 disposed within channel 24. A first end of dumbbell shaped valve 21 is supported in channel 24 by valve seat 35 with the opposite end extending into chamber 36 and positioned so that movement of member 20 enables the opposite end of valve 21 to seal orifice 22 while opening channel 24 by pushing the first end away from valve seat 35 and to open orifice 22 by moving the opposite end away therefrom while the first end presses against valve seat 35 to seal channel 24. Although it is preferred that opening 24 and orifice 22 be coaxially aligned so as to enable a dumbbell shaped valve such as valve 22 to operate in the manner previously described, it is to be understood that any type of valve means that is able to seal the vent member while opening the orifice or vice versa as hereinbefore described is considered within the scope of the invention whether or not the opening in the vent member and orifice are coaxially aligned.

Linking member 18 connects component 16 and member 20 in such a manner that coil 17 exerts a force on member 20 away from chamber 36 towards coupling member 14 that is counter-balanced by the force exerted by diaphragm 34 on member 20 in a direction away from coupling member 14 towards chamber 36. Nut 23 is adjustable to move regulator 2 towards and away from member 14 to provide the counter-balancing of forces described so that, when counter-balanced, the one end of valve 21 preferably seals channel 24 and the opposite end preferably seals the orifice 22 between inlet port 3 and outlet port 4. The balancing of forces as previously described provides an output fluid pressure control signal that is highly sensitive to changes in rotational speed of the object being monitored by mechanism 54. Thus, for example, when the rotational speed of the object is increased, extensions 30 press coupling member 14 against component 16 which then compresses coil 17 to reduce the force exerted by coil 17 towards member 14 and permits the force exerted on member 20 by diaphragm 34 to move member 20 towards chamber 36 which causes the opposite end of valve 21 to seal orifice 22 and the first end of valve 21 to move away from valve seat 35 to open channel 24 and vent fluid pressure from chamber 36. As the speed of the object increases, coil 17 is increasingly compressed by member 14 which, as previously described, increasingly vents fluid pressure from chamber 36 to provide the fluid pressure control signal versus RPM profile hereinafter described with respect to FIG. 4. Likewise, for a decreasing rotational speed of the object, extensions 30 cease biasing member 14 towards chamber 36 while coil 17 biases member 14 away from chamber 36 which causes linking member 18 to move member 20 away therefrom which in turn causes the first end of valve 21 to press against valve seat 35 to seal channel 24 while the opposite end is pulled away to open orifice 22 such that for a decreasing rotational speed of the object channel 24 is sealed and fluid pressure is able to increase in chamber 36 by passing thereinto from inlet port 3.

The force balancing arrangement between the resilient means in the form of coil 17 and diaphragm 34 provides an extremely sensitive response to changes in rotational speed not heretofore available from prior art type mechanisms and is able to provide an output fluid pressure control signal from outlet port 4 that is highly sensitive and effective for purposes of controlling devices that are desired to be controlled by changes in the rotational speed of an object. Although particularized with respect to the embodiment shown in FIGS. 1, 2 and 3, it is to be understood that such is for illustrative purposes only for included within the scope of the invention are embodiments for which the movements of member 14 previously described are reversed as well as those in which the resilient means to which the first end of linking member 18 is connected to is supported such that it is compressed by an opposite movement of member 14 as described herein or those in which the opposite end of member 18 is not connected to member 20 as described herein but rather is attached at some other location to diaphragm 34. Likewise, although it is preferred to use dumbbell shaped valve 21 in the manner previously described, any valve that is suitably able to seal a vent opening in diaphragm 34 while at the same time opening orifice 22 or vice versa in response to unbalancing of the forces upon member 20 as previously described is considered within the scope of the invention.

Figure 4:
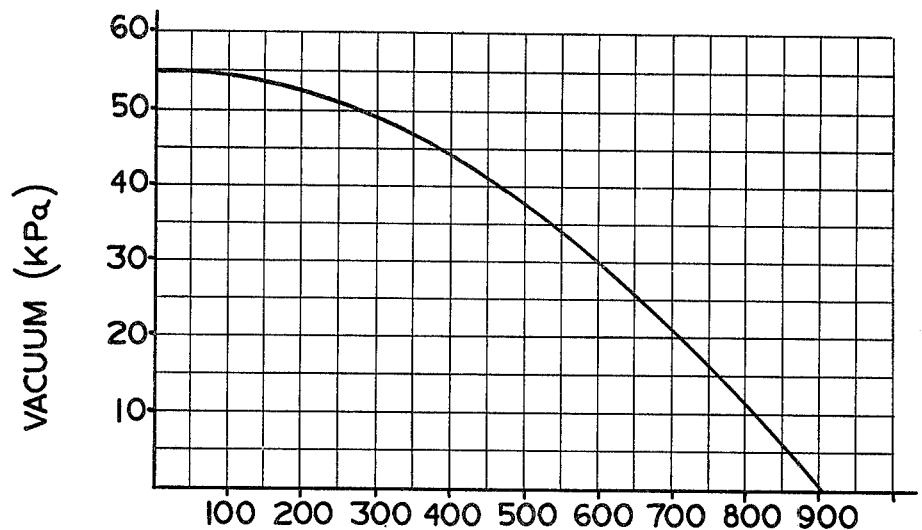
FIG. 4 shows a graph of the fluid pressure (vacuum) control signal versus engine RPM for the embodiment of the mechanism of the invention shown in FIGS. 1, 2 and 3.

FIG. 4 shows the fluid pressure (vaccum) output signal from outlet port 4 in kilopascals as a function of increasing rotational speed of assembly 27 of embodiment 54 of the mechanism of the invention shown in FIGS. 1, 2 and 3. In the case of FIG. 4, the vaccum supply input into inlet port 3 was 60 kilopascals resulting in approximately 54 kilopascals output at 0 RPM after calibration by movement of nut 23. Understandably, the curve in FIG. 4 of fluid pressure (vaccum) signal as a function of RPM is representative of the fluid pressure control signal provided by embodiment 54 of FIGS. 1, 2 and 3 and variations in the particular embodiment of the mechanism of the invention will give rise to fluid pressure signal versus rotation speed curves that differ from that shown in FIG. 4.

FIG. 5 is a partial cross-section showing a preferred method of rotating member 5 of embodiment 54 of the mechanism of the invention allowing members 5 and 6 to be aligned. In FIG. 5, an idler gear 37 is disposed between gear 11 and gear 10. The teeth of gear 37 engage with the teeth of gear 11 at 39 and with the teeth of gear 10 at 38 such that the rotation of gear 11 in one direction is able to rotate gear 37 in the opposite direction which in turn is able to rotate gear 10 in the same direction as gear 11. Understandably, the number of teeth and diameter of each of the gears 10, 11 and 37 as well as gears 10 and 11 of FIG. 3 is able to provide a member 5 with a rotational speed that is the same as or proportional to the rotational speed of shaft 6 as desired. Also more than one idler gear 37 may be used where deemed useful for the particular rotational speed and direction desired of member 5 in relationship to the rotational speed and direction of rotation of shaft 6. Also shown in FIG. 5 is a rotating member 40 which is rotatably mounted and may be used as a means of rotating gear 11 or in turn which may be rotated by gear 11 to provide an RPM connection to some other device where desired.

FIG. 6A shows one embodiment of a preferred means of causing shaft 6 of embodiment 54 of the mechanism of the invention shown in FIGS. 1, 2 and 3 to rotate in response to the rotation of the object being monitored by the mechanism of the invention. In FIG. 6A, one end of flexible cable 41 has means 42 associated therewith for monitoring the rotational speed of an object such as rotating shaft 43 of an internal combustion engine. Monitoring means 42 causes cable 41 to rotate at a speed that may be the same as or that may be proportional to the rotational speed of shaft 43. Preferably cable 41 is enclosed by and able to rotate within outer protective jacket 44 that is secured from movement with respect to cable 41, housing 1 and shaft 43 by either or both means 42 or securement means 45 disposed at the opposite end of cable 41 or by other suitable securement means. The opposite end of cable 41 extends through securement means 45 and into a rotatable nut 46 having external threads 49 that enable nut 46 to be threadingly engaged with threads 29 on housing 1. Hub 48 is secured to the end of cable 41 within cavity 50 of nut 46 and is rotatable therewith so that when nut 46 is tightened down to housing 1, hub 48 is able to be rotated by cable 41 within cavity 50. Hub 48 has a bore 47 therewithin that aligns with and is adapted to receive shaft 6 of embodiment 54 of the mechanism of the invention of FIGS. 1, 2 and 3 and become frictionally secured thereto when nut 46 is tightened onto housing 1 such that the rotation of cable 41 is able to rotate shaft 6 by means of the rotation of hub 48. Although it is preferred to use means for causing the rotation of member 5 such as cable 41 enclosed by jacket 44 shown in FIG. 6, it is to be understood that a flexible cable 41 without a jacket 44 may be used where desired and that the mechanism of the invention includes embodiments which employ any mechanical or electrical or elecro-mechanical means of rotating member 5 and assembly 27 either directly such as by the sheave and belt arrangement shown in FIG. 6B or thru gearing arrangements that are able to rotate members 5 and assembly 27 indirectly by first rotating a member such as shaft 6.

In FIG. 6B, member 6 of mechanism 54 is rotatably mounted in bearing 7 as previously described with respect to FIG. 3. Sheave 51 is fixedly secured to member 5 and is connected by means of belt 53 to sheave 52 that is fixedly secured to rotating shaft 43. Shaft 43 as previously described may be any member that rotates proportional to the engine speed. Rotation of shaft 43 causes sheave 52 to rotate which in turn causes belt 53 to move and rotate sheave 51 which in response to such rotation causes member 6 to rotate at a speed proportional to the speed of rotation of shaft 43. Sheaves 51 and 52 and belt 53 of FIG. 6B illustrate that a belt drive mechanism may be used to rotate member 6 rather than cable 41 previously described with respect to FIG. 6A when such is desired in a particular application. Understandably embodiments of the invention include those in which member 5 is rotated directly rather than indirectly through the rotation of member 6.

The mechanism of the invention may be used singularly or in combination with one or more additional sensing means to control or otherwise maintain desired operating conditions of a motor such as the idling speed of an internal combustion engine, the temperature of the coolant fluid and the like and also to control accessories associated with motors such as transmission components and pollution control devices and the clutching and de-clutching of alternators and/or compressors associated therewith and the like.

Figure 7:
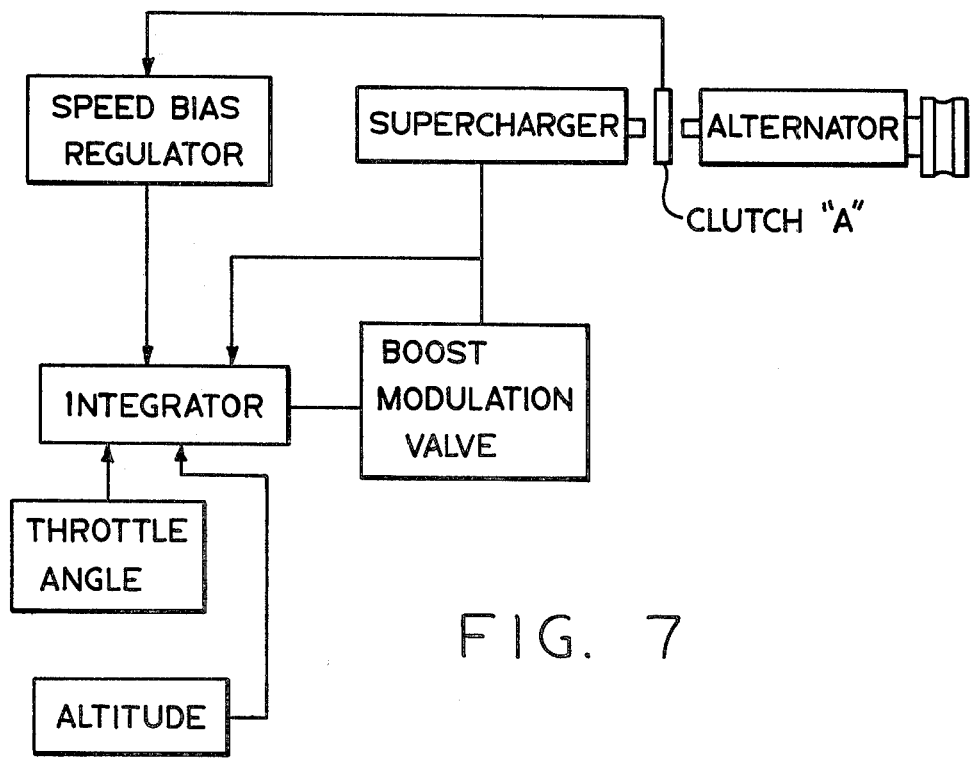
FIG. 7 shows a block diagram showing the use of the mechanism of the invention in a system for controlling a supercharger of an internal combustion engine.

FIG. 7 illustrates the use of the mechanism of the invention in combination with two additional sensing means for the control of a supercharger of an internal combustion engine. In FIG. 7, the speed bias regulation mechanism of the invention monitors the rotational speed of clutch A as shown by the arrow. The rotatable member and centrifugal weight assembly of the mechanism are caused to rotate in the manner hereinbefore described so as to regulate a vacuum supply (not shown) to provide an output vacuum signal that is proportional to the rotational speed of the alternator. The vaccum signal is conveyed to an integrator which is adapted to combine the vacuum signal in the manner desired with a vacuum signal that is proportional to the throttle angle setting of the engine and a vacuum signal that is proportional to the atmospheric pressure (altitude) to which the engine is exposed. An example of a suitable integrator is disclosed in copending U.S. patent application Ser. No. 289,545 owned by the assignee of the present invention. An example of a suitable barometric pressure regulator is disclosed in copending U.S. patent application Ser. No. 309,286 owned by the assignee of the present invention. The three vacuum signals are combined by the integrator in the manner desired with the combination conveyed to a boost modulation valve that is adapted to provide an increased supply of air to the engine at a predetermined rotational speed of the engine that is preferably greater than the idling speed thereof so as to relieve the engine of the burden of rotating the supercharger when the engine is idling.

The system preferably includes feedback means which conveys the output signal from the boost modulator valve back to the integrator as a means of informing the integrator of when a signal is being conveyed to the supercharger and the relative value of the signal. The feed back means is preferably adapted so as to prevent the combined vacuum signals from actuating the supercharger when the engine is idling. Generally the control system is preferably operably calibrated such that the supercharger is not actuated at the particular engine's idling speed but is actuated as a result of acceleration of the engine speed caused by depression of the foot pedal controlling the throttle up to cruising speed at which speed the speed bias regulation fluid pressure regulating mechanism of the invention is able to actuate and de-actuate the supercharger in response to whether the engine speed is increasing above or decreasing below the particular cruising speed maintained.

The combination of the vacuum signals provided by the speed biasing mechanisms of the present invention with the vacuum signals provided by the throttle angle and altitude regulator in the system shown in FIG. 7 is only one combination that might suitably be used in conjunction with the mechanism of the present invention to control a supercharger of an internal combustion engine or any other accessory associated with the engine, for, depending upon which engine operating conditions are desired to control the operation of the supercharger or any other operating condition of the engine and/or accessories associated with the engine, the mechanism of the present invention is able to provide a fluid pressure signal based upon unbalancing counterbalanced resilient forces to provide a control signal that is highly sensitive to changes in the rotational speed of the object being monitored by the mechanism for the use thereof singularly or in combination with fluid pressure signals derived from such one or more additional engine operating conditions in the manner hereinbefore described.

Although the invention has been described hereinabove with respect to presently preferred embodiments, it will be understood by those skilled in the art that modifications and variations may be made within the scope of the invention, which is limited only by the following claims.

What is claimed is:

1. A rotational speed biasing fluid pressure regulation mechanism adapted to provide a fluid pressure signal for use in the control of a fluid pressure controllable device whose function is desired to be governed by the rotational speed of an object, said mechanism comprising;

a support, a body member rotatably mounted on the support and having means associated therewith that enables the body member to be rotatably driven in response to the rotation of the object, a coupling member moveably mounted with respect to the support in such a manner as to be able to move without interfering with the rotation of the body member, a centrifugal weight assembly secured to the body member and able to rotate therewith in response to the rotation of the object, said assembly having at least one component thereof that biases the coupling member in one direction as a result of the effect of the change in centrifugal force upon the assembly arising from a change in the rotation of the body member caused by a change in the rotational speed of the object, resilient means positioned so as to be compressed by the coupling member when the coupling member is biased in the one direction and able to bias the coupling member in a direction opposite to the one direction as a result of the effect of a change in the centrifugal force upon the assembly that is opposite to the change that biased the coupling member in the one direction, a fluid pressure regulator positionable with respect to the coupling member, said regulator having a fluid pressure chamber disposed on one side of a resilient diaphragm therewithin that has an inlet port in fluid communication therewith for conveying a supply of fluid pressure thereto that is separated by an orifice from an outlet port in fluid communication therwith for conveying the regulated fluid pressure control signal therefrom, said diaphragm having a vent member secured thereto having an opening thereof that extends through the diaphragm for venting fluid pressure from the chamber in response to movement of the diaphragm by means of a valve member which in response to movement of the diaphragm in one direction is able to seal the vent member opening while opening the orifice so as to decrease the fluid pressure in the chamber for the subsequent conveyance therefrom as the fluid pressure control signal, and in response to movement of the diaphragm in the opposite direction is able to open the vent member while sealing the orifice so as to increase the fluid pressure in the chamber for the subsequent conveyance therefrom as the fluid pressure control signal; and a linking member for connecting the resilient means to the diaphragm in such a manner that the resilient means is able to impose a force upon the vent member that is counter-balanced by a force imposed thereon by the resilient diaphragm so that the compression of the resilient means by the coupling member reduces the force imposed on the diaphragm by the resilient means so as to allow the force imposed on the vent member by the diaphragm to move the vent member in the one direction and the biasing of the coupling member in the opposite direction by the resilient means causes the linking member to move the vent member in the opposite direction.

2. The mechanism of claim 1 wherein the body member is rotatably mounted vertically on the support.

3. The mechanism of claim 1 or 2 wherein the body member is a shaft.

4. The mechanism of claim 1 wherein the means enabling the body member to be rotatably driven in response to the rotation of the object comprises a cable having one end thereof connected to means which engage with the object and cause the cable to rotate in response to the rotation of the object and having means connected to the opposite end thereof which engage with means disposed on the body member and cause the body member to rotate in response to the rotation of the cable.

5. The mechanism of claim 4 wherein the cable is disposed within an outer protective jacket that is secured against rotation with respect to the support with the cable able to rotate therewithin to cause the rotation of the rotatable member.

6. The mechanism of claim 4 wherein the means connected to the opposite end of the cable is a gear and the means disposed on the body member is a gear, said gears adapted to engage with each other and cause the body member to rotate in response to the rotation of the cable.

7. The mechanism of claim 6 including at least one idler gear disposed between the body member gear and the cable gear and engaged therewith so as to cause the body member gear to rotate in response to the rotation of the cable gear.

8. The mechanism of claim 1 wherein the means enabling the body member to be rotatably driven in response to the rotation of the object comprises a belt and sheave arrangement that is caused to move in response to rotation of the object and is connected to the mechanism in such a manner as to cause the body member to rotate in response to the movement thereof.

9. The mechanism of claim 1 wherein the coupling member is moveably mounted with respect to the support by being slidingly engaged with a shaft associated with the body member such that the coupling member is biased in the one and in the opposite direction along the shaft.

10. The mechanism of claim 1 wherein the resilient means comprises at least one coiled spring provided with means that enable the spring to be compressed when pressed by the movement of the coupling member in the one direction and enable the spring to press against and bias the coupling member in the opposite direction.

11. The mechanism of claim 1 wherein the object is a member that is rotated by a motor.

12. The mechanism of claim 11 wherein the motor is an internal combustion engine.

13. The mechanism of claim 1 wherein the opposite end of the linking member is connected to the diaphragm by being connected to the vent member.

14. The mechanism of claim 1 wherein the vent member opening and the orifice are axially aligned.

15. The mechanism of claim 14 wherein the valve means comprises a dumbbell shaped valve having a first end thereof disposed within the vent member opening and supported by a valve seat therein with the opposite end thereof extending from the vent member opening and positioned axially with the orifice such that the movement of the vent member in the one direction causes the opposite end thereof to press against and seal the orifice while the first end thereof is pushed away from the valve seat to open the vent member opening and the movement of the vent member in the opposite direction causes the opposite end thereof to open the orifice by moving away therefrom while the first end thereof is caused to press against the valve seat and seal the vent member opening.

16. The mechanism of claim 1 wherein the fluid pressure regulator is positionable with respect to the coupling member by being threadingly engaged with the support by means of a rotatable nut in such a manner that rotation of the nut is able to calibrate the mechanism by causing the regulator to move towards and away from the moveable member.

* * * * *